United States Patent [19]
Rucklidge et al.

[11] Patent Number: 5,835,638
[45] Date of Patent: Nov. 10, 1998

[54] METHOD AND APPARATUS FOR COMPARING SYMBOLS EXTRACTED FROM BINARY IMAGES OF TEXT USING TOPOLOGY PRESERVED DILATED REPRESENTATIONS OF THE SYMBOLS

[75] Inventors: William James Rucklidge, Mountain View, Calif.; Daniel P. Huttenlocher, Ithaca, N.Y.; Eric W. Jaquith, San Francisco, Calif.

[73] Assignee: Xerox Corporation, Stamford, Conn.

[21] Appl. No.: 655,546

[22] Filed: May 30, 1996

[51] Int. Cl.⁶ .............................. G06K 9/42; G06K 9/44; G06K 9/46; G06K 9/68
[52] U.S. Cl. .......................... 382/257; 382/170; 382/204; 382/219
[58] Field of Search ..................................... 382/170, 181, 382/209, 217, 218, 204, 221, 224, 225, 226, 257, 258, 270, 271

[56] References Cited

U.S. PATENT DOCUMENTS

| 2,905,927 | 9/1959 | Reed ........................................ 340/149 |
| 3,133,266 | 5/1964 | Frishkopf .............................. 340/146.3 |
| 3,295,105 | 12/1966 | Gray et al. ............................ 340/146.3 |
| 4,010,445 | 3/1977 | Hoshino ................................ 340/146.3 |
| 4,155,072 | 5/1979 | Kawa ..................................... 340/146.3 |
| 4,326,190 | 4/1982 | Borland et al. ....................... 340/146.3 |
| 4,400,828 | 8/1983 | Pirz et al. .................................. 382/30 |
| 4,410,916 | 10/1983 | Pratt et al. ............................... 358/263 |
| 4,495,644 | 1/1985 | Parks et al. .................................. 382/3 |
| 4,558,461 | 12/1985 | Schlang ....................................... 382/9 |

(List continued on next page.)

OTHER PUBLICATIONS

Arkin, E.M., Chew, L.P., Huttenlocker, D.P., Kedem, K., and Mitchell, J.S.B., "An Efficiently Computable Metric for Comparing Polygonal Shapes", in Proceedings of the First Annual ACMSIAM Symposium On Discrete Algorithms, San Francisco, California, Jan. 22–24, 1990., pp. 129–137.

Holt, M.J.J., and Xydeas, C.S., "Compression of Document Image Data by Symbol Matching", Department of EEE Loughborough Univ. of Technology, England, 1986, pp. 184–190.

Sato, J., Kuwamura, Y., and Ohno, C., "F6365 Japanese Document Reader," Fujitsu Sci. Tech. J., Oct. 1990, pp. 224–233.

Huttenlocker, D.P., Klanderman, G.A., and Rucklidge, W.J., "Comparing Images Using the Hausdorff Distance," Department of Computer Science, Cornell University, Ithica, NY, CUCS TR 91–1211, Abstract, pp. 1–34.

(List continued on next page.)

*Primary Examiner*—Bipin Shalwala
*Attorney, Agent, or Firm*—Richard B. Domingo

[57] ABSTRACT

A method and apparatus for comparing symbols extracted from binary images of text for classifying into equivalence classes. The present invention uses a Hausdorff-like method for comparing symbols for similarity. When a symbol contained in a bitmap A is compared to a symbol contained in a bitmap B, it is determined whether or not the symbol in bitmap B fits within a tolerance into a dilated representation of the symbol in bitmap A with no excessive density of errors and whether the symbol in bitmap A fits within a tolerance into a dilated representation of the symbol in bitmap B with no excessive density of errors. If both tests are passed, an error density check is performed to determine a match. The dilated representation of the bitmap accounts for various quantization errors that may occur along the boundaries of a symbol defined in the respective bitmaps. The dilation utilized preserves the topology of the symbol. The topology preserving dilation is one where symbols are "thickened" yet the local topology (or connectedness) of the symbol is not changed. Such a dilation is performed by applying a set of local rules to "off" pixels that are adjacent to "on" pixels. Quantization effects are also accounted for through the use of a non-linear error allowance. The non-linear error allowance implements the idea that small symbols provide for little or no error, whereas large symbols provide for a proportionately larger amount of error.

23 Claims, 6 Drawing Sheets

U.S. PATENT DOCUMENTS

| | | | |
|---|---|---|---|
| 4,641,356 | 2/1987 | Sternberg | 382/257 |
| 4,701,960 | 10/1987 | Scott | 382/3 |
| 4,731,857 | 3/1988 | Tappert | 382/9 |
| 4,764,972 | 8/1988 | Yoshida et al. | 382/13 |
| 4,769,716 | 9/1988 | Casey et al. | 358/263 |
| 4,809,344 | 2/1989 | Peppers et al. | 382/32 |
| 4,864,628 | 9/1989 | Scott | 382/21 |
| 4,918,740 | 4/1990 | Ross | 382/9 |
| 4,926,490 | 5/1990 | Mano | 382/9 |
| 4,933,977 | 6/1990 | Ohnishi et al. | 382/9 |
| 4,949,281 | 8/1990 | Hillenbrand et al. | 364/518 |
| 4,949,392 | 8/1990 | Barski et al. | 382/61 |
| 4,956,869 | 9/1990 | Miyatake | 382/22 |
| 4,977,603 | 12/1990 | Irie et al. | 382/34 |
| 5,142,589 | 8/1992 | Lougheed et al. | 382/9 |
| 5,214,719 | 5/1993 | Budd et al. | 382/23 |
| 5,216,725 | 6/1993 | McCubbrey | 382/9 |
| 5,303,313 | 4/1994 | Mark et al. | 382/56 |
| 5,539,841 | 7/1996 | Huttenlocher et al. | 382/218 |

OTHER PUBLICATIONS

Huttenlocker, D.P., and Rucklidge, W.J., "A Multi–Resolution Technique for Comparing Images Using the Hausdorff Distance," Department of Computer Science, Cornell University, Ithica, NY, TR 92–1321, Dec. 1992, Abstract, pp. 1–20.

$$\begin{cases} (1) & \text{X@X} \\ (2) & \text{X@OX} \\ (3) & \text{X@}^{\text{OX}} \\ (4) & \text{X@}_{\text{OX}} \end{cases}$$

FIG. 7

$$\begin{cases} (5) & \begin{matrix} \text{X} \\ \text{X@X} \\ \text{OO} \end{matrix} \\[2em] (6) & \begin{matrix} \text{OO} \\ \text{X@X} \\ \text{X} \end{matrix} \\[2em] (7) & \begin{matrix} \text{X} \\ \text{X@X} \\ \text{O} \\ \text{O} \end{matrix} \\[2em] (8) & \begin{matrix} \text{X} \\ \text{X@OO} \\ \phantom{\text{X@}}\text{O} \\ \phantom{\text{X@}}\text{X} \end{matrix} \\[2em] (9) & \begin{matrix} \text{X} \\ \phantom{\text{X@}}\text{O} \\ \text{X@OO} \\ \text{X} \end{matrix} \\[2em] (10) & \begin{matrix} \text{XO} \\ \text{X@O} \\ \phantom{\text{X@}}\text{O} \\ \phantom{\text{X@}}\text{X} \end{matrix} \\[2em] (11) & \begin{matrix} \text{X} \\ \phantom{\text{X@}}\text{O} \\ \text{X@O} \\ \phantom{\text{X@}}\text{XO} \end{matrix} \end{cases}$$

FIG. 8

METHOD AND APPARATUS FOR COMPARING SYMBOLS EXTRACTED FROM BINARY IMAGES OF TEXT USING TOPOLOGY PRESERVED DILATED REPRESENTATIONS OF THE SYMBOLS

CROSS REFERENCE TO RELATED APPLICATIONS

The present application is related to commonly assigned U.S. patent application Ser. No. 08/430,106 entitled "Method For Comparing Image Sections To Determine Similarity Therebetween", filed Apr. 27,1995, which is a continuation of application Ser. No. 08/170,075 filed Sep. 17, 1993.

FIELD OF THE INVENTION

The present invention is related to the field of processing scanned images of text and in particular, to comparing symbols extracted from said scanned images of text for classification into equivalence classes.

BACKGROUND OF THE INVENTION

It has become commonplace to manipulate scanned images of text. A scanned image of text is a bitmapped representation of a medium containing the text. Some applications that perform image processing tasks such as image compression and Optical Character Recognition (OCR) can be performed by grouping symbols into equivalence classes. In other words, symbols that have a similar shape are identified. This grouping of symbols is also referred to as symbol classification. In the case of image compression, this grouping permits the group to be represented by a single instance of the shape (e.g. a letter or number) along with position information indicating locations on a medium where the shape is to be positioned. In the case of OCR, the grouping indicates that an instance is a particular character.

In such classification, symbols are extracted from the binary image and matched to templates for one or more equivalence classes. Classification is based partially on gross symbol features, like width, height and mass (number of black pixels), as well as on the detailed shape of each symbol. Typically, the templates are "bitmaps" of the symbol representing the equivalence class. The primary classification criteria are based on the salient differences between the shapes of the extracted symbol and the template. Typically, error pixels are defined as pixels which are "on" in either the extracted symbol or template, but not both.

As described above, the heart of such a system is the classification process. In the classification processing it is decided if two extracted shapes are the same and are thus part of the same equivalence class. In order to get good compression (or character recognition), a classifier should produce a small number of classes. In order to avoid symbol substitution errors, it should create a new class each time it's not really sure that a new symbol matches any of the existing templates. This tends to create a large number of classes.

An example of image compression based on symbol matching is described in U.S. Pat. No. 5,303,313 entitled "Method and Apparatus For Compression Of Images", Mark et al., issued Apr. 12, 1994 (the '313 patent). In the '313 patent an image is "precompressed" prior to symbol matching. The '313 patent describes using run-length encoding for such precompression. Symbols are extracted from the run-length representation. A voting scheme is used in conjunction with a plurality of similarity tests to improve symbol matching accuracy. The '313 patent further discloses a template composition scheme wherein the template may be modified based on symbol matches.

Another technique for matching symbols is known as the Hausdorff method. The Hausdorff method uses a distance measuring technique and is described by Huttenlocher et al. in "Comparing Images Using the Hausdorff Distance" (TR 91–1211) June 1991, and "A Multi-Resolution Technique for Comparing Images Using the Hausdorff Distance" (TR 92–1321), December 1992, both published by the Department of Computer Science, Cornell University. The Hausdorff distance is a measure for comparing point sets that can be used to compare binary images. In particular, given two finite point sets A and B, the Hausdorff distance is defined as:

$$H(A,B) = \max(h(A,B), h(B,A))$$

where $$h(A,B) = \max_{a \in A} \min_{b \in B} |a-b|$$

and $|a-b|$ is the distance between the two given points a and b.

The function $h(A,B)$ ranks each point of A based on its distance to the nearest point of B, and then the largest ranked such point (the most mismatched point) specifies the value of the distance. Thus if $h(A,B)=\delta$ (delta), this means that each point of A is within distance $\delta$ of some point of B. The function $H(A,B)$ is the maximum of the two asymmetric distances, and thus if $H(A,B)=\delta$ this means that each point of A is within $\delta$ of some point of B and vice versa. The Hausdorff distance thus provides a measure of similarity of two binary images (or finite point sets), as larger values of $\delta$ indicate less similarity between the images.

An undesirable artifact of the scanning process is the quantization effect. If an intensity change between light and dark in an image occurs within a given pixel, that pixel will be "on" or "off" depending on the exact alignment of the change. For example, if more than ½ of the pixel is covered by a dark area then the pixel will be "on". Otherwise it is "off". This may cause pixel quantization noise at the boundaries of a symbol image where pixels will turn from "off" to "on". One way for accounting for such pixel quantization noise is to permit a certain error allowance when matching symbols. Such an error allowance would often depend on various factors such as symbol size or scanning resolution.

Another technique, derived from the Hausdorff distance, is to dilate symbols when they are being compared. Dilation of a symbol consists of replacing each "on" pixel with a (generally small) set of "on" pixels. By dilating an image with a disk of radius 1 (the 4 immediate neighbors) or radius 1.5 (the 8 immediate neighbors) before comparing it with another image, these kinds of effects can be minimized.

One technique for comparing bitmaps using such dilation is now described. Given two image bitmaps, call them A and B, and the dilation of B by a disk of radius delta, call it $B^\delta$, count the number of "on" pixels in the logical AND of A and $B^\delta$, and divide by the number of "on" pixels of A. The larger this ratio, the better the match of A to B (with 1.0 being a perfect match).

SUMMARY

A method and apparatus for comparing symbols extracted from binary images of text for classifying into equivalence classes is disclosed. Classification of symbols into equivalence classes is used to enable such image processing tasks as image compression and Optical Character Recognition. The present invention seeks to minimize the number of errors caused by incorrect comparisons that occur during a symbol matching process. Such errors may typically occur because of the quantization effect that occurs during the scanning process. The quantization effect will typically cause errors that occur along the boundaries of a symbol where pixels turn from black to white.

The present invention is based on a Hausdorff-like method for comparing the similarity of bitmaps. Consider a symbol contained in bitmap A and a symbol contained in bitmap B. Of interest is whether the symbol contained in bitmap A matches the symbol contained in bitmap B. The symbol matching steps of the present invention are comprised of: creating a first comparison bitmap containing a dilated representation of the symbol contained in bitmap A, determining a first error allowance based on the size of the symbol contained in bitmap B, determining if the symbol contained in bitmap B fits inside the dilated symbol contained in the first comparison bitmap within the threshold of the first error allowance and there are no excessive error densities, if yes, creating a second comparison bitmap containing a dilated representation of the symbol contained in bitmap B, determining a second error allowance based on the size of the symbol contained in bitmap A, determining if the symbol contained in bitmap A fits inside the dilated symbol contained in the second comparison bitmap within the threshold of the second error allowance and there are no excessive error densities, if both fit and there are no excessive error densities, indicating that bitmap A matches bitmap B. Finally, when a match is determined, finding a "best match" location by shifting one of the bitmaps relative to the other and identifying the position resulting in the fewest errors.

As described above, quantization effects may introduce errors along the boundaries of symbols. Such quantization errors are handled in two ways: 1) through the use of a topology preserving dilation, and 2) through the use of a non-linear error allowance scheme. The topology preserving dilation is one where symbols are "thickened" yet the local topology (or connectedness) of the symbol is not changed. Such a dilation is performed by applying a set of local rules to "off" pixels that are adjacent to "on" pixels. The non-linear error allowance conforms to the idea that small symbols should provide for little or no error, whereas large symbols should provide for a proportionately larger amount of error.

BRIEF DESCRIPTION OF THE FIGURES

FIG. 7 illustrates the "exception" pixel configurations to when an "off" pixel that is adjacent to "on" pixel is not turned "on".

FIG. 8 illustrates the exceptions to the exceptions of FIG. 7, wherein an "off" pixel is in the configuration of FIG. 7 but nonetheless is turned "on".

DETAILED DESCRIPTION OF THE PREFERRED EMBODIMENT

A method and apparatus for comparing symbols extracted from binary images of text for classifying into equivalence classes is disclosed. The present invention may be used in various applications such as Optical Character Recognition (OCR), data encryption or data compression. Such applications may be found as part of an overall image processing system or as stand-alone applications. The currently preferred embodiment of the present invention is implemented as software running on a computer based system for performing text image data compression. Such software may be distributed on or reside on a suitable memory medium such as magnetic hard disks or diskettes, optical disks such as CD-ROMS, PCMCIA cards having a memory medium, or the like.

The following terms and their meanings are used in this description:

Image refers to the markings on or appearance of a medium.

Image data refers to a representation of an image which may be used for recreating the image.

An equivalence class is a set of symbols found in an image that can be substituted for one another without changing the appearance of an image in an objectionable way.

An exemplar of the equivalence class is the bitmap that will be substituted for every member of the equivalence class when the image is decompressed or otherwise recreated.

An extracted symbol or symbol is an image representation in the form of a bitmap, run length, or other standard encoding, of a marking on a medium obtained from image data.

A symbol dictionary or dictionary is a structure used for organizing and maintaining equivalence classes and is used in both classification process as well as when the image is decompressed or otherwise recreated.

The system of the currently preferred embodiment utilizes and maintains a list of equivalence classes (also referred to as a dictionary). An extracted symbol is compared to exemplars of the equivalence classes to determine if it should be added to an existing equivalence class. If there is no match, a new equivalence class is created with the extracted symbol as the exemplar.

Figure 1:
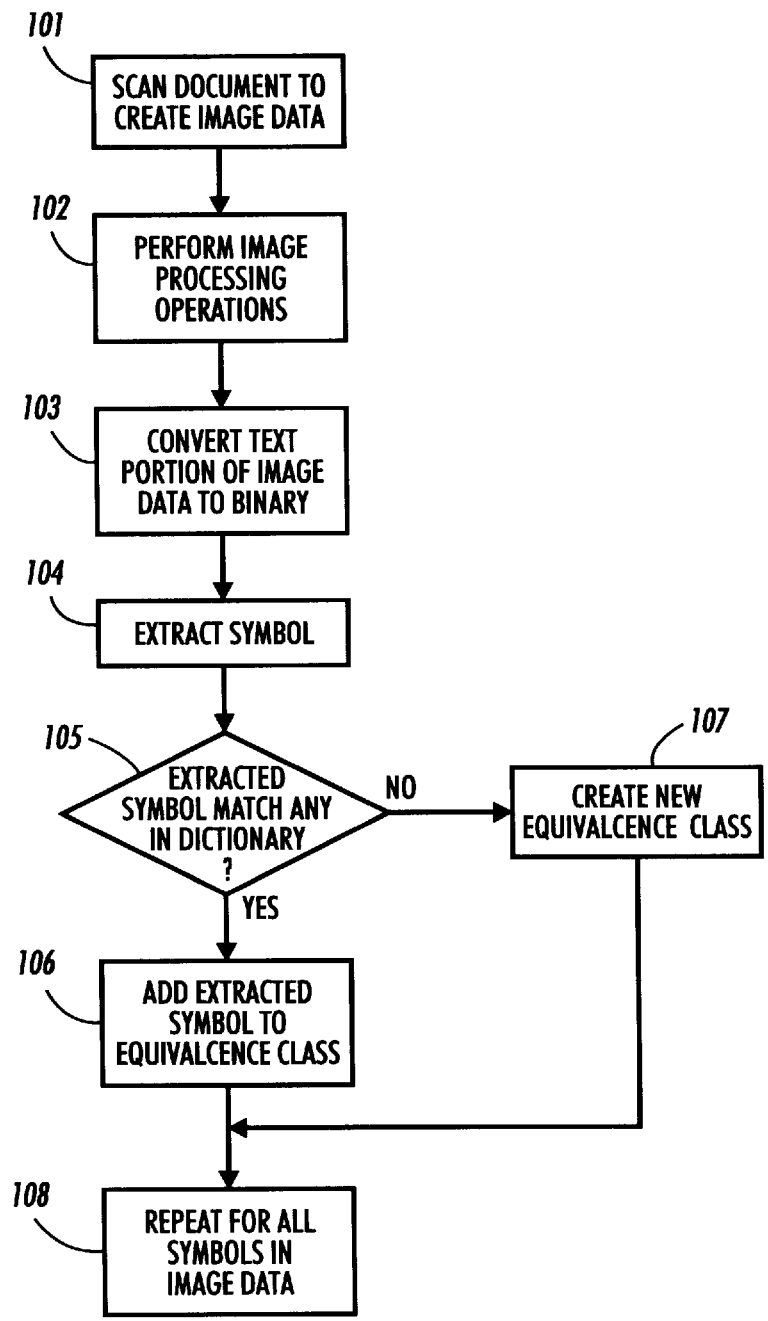
FIG. 1 is a flowchart illustrating the steps performed by an application that may utilize the present invention.

As noted above, the present invention may be used in various applications. FIG. 1 is a flowchart which describes the general steps of an application utilizing the present invention. First, a document is scanned to create image data, step 101. The image data is typically a bitmapped representation of the image. As will be discussed below, the scanning step has a quantization effect which may introduce errors or noise. Various operations may then be performed on the image data such as image clean-up or segmentation of text and image, step 102. It is the text portion that is processed by the present invention. The text portion of the image data is then converted into a binary representation, e.g. by some thresholding technique, to create a representation where each pixel is represented by a single bit, step 103. A "black" or "on" pixel is typically represented by a binary 1 value while a "white" or "off" pixel is represented as a binary 0. It is at this point where symbol classification begins.

First, a new individual symbol is extracted from the text image data, step 104. In the currently preferred embodiment, this extraction will occur through a connected components analysis of the binary image. A connected components analysis typically is the process of finding sets of "black" or "on" pixels which are adjacent thus forming a symbol. Various techniques for performing connected component analysis are known in the art, and any would be suitable for use in the present invention. The extracted symbol is represented by a bounding box in a coordinate system with the upper left hand corner as the origin. The bounding box contains the binary values comprising the pixels of the extracted symbol. It is then determined if the extracted symbol matches any previously extracted symbols stored in a symbol dictionary, that are the same as or similar to physical dimensions of the extracted symbol, step 105. The physical dimensions are typically represented by a bounding box containing the symbol It is this comparison step that is the heart of the classification process. If a match is found, the extracted symbol is added to the equivalence class of the matched symbol, step 106. If the new symbol does not fit into any equivalence class, a new equivalence class is created, step 107. In the currently preferred embodiment, the exact shape of a symbol that is added to an existing class is saved pending the committing process described below. The steps 104–107 are then repeated for all symbols in the image, step 108.

Symbol Classification

Figure 2:
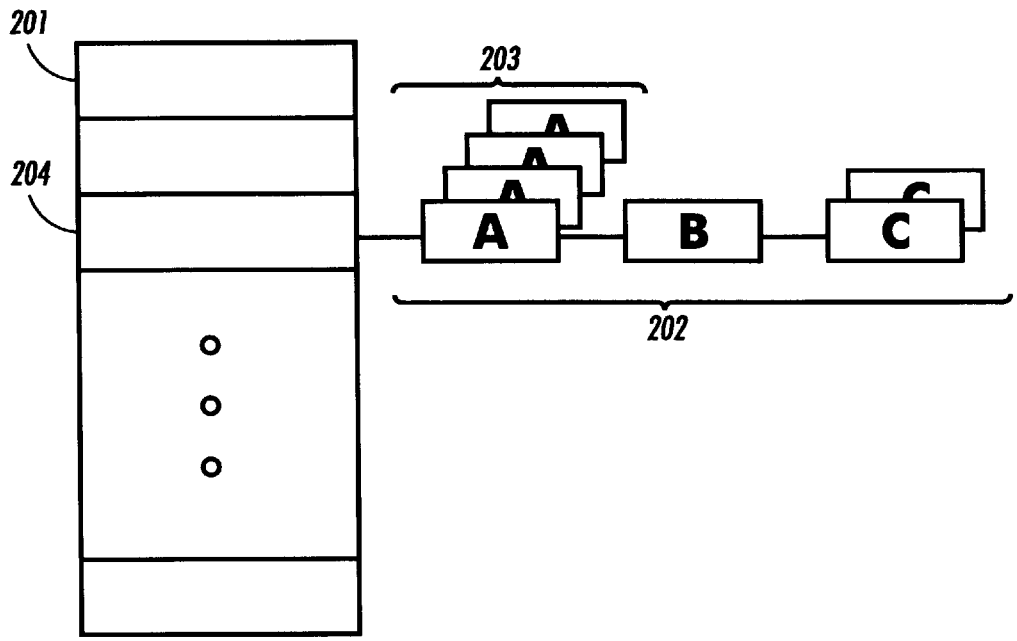
FIG. 2 is a block representation of a data structure for a symbol dictionary used in the symbol comparison and equivalence class classification of the currently preferred embodiment of the present invention.
Figure 3:
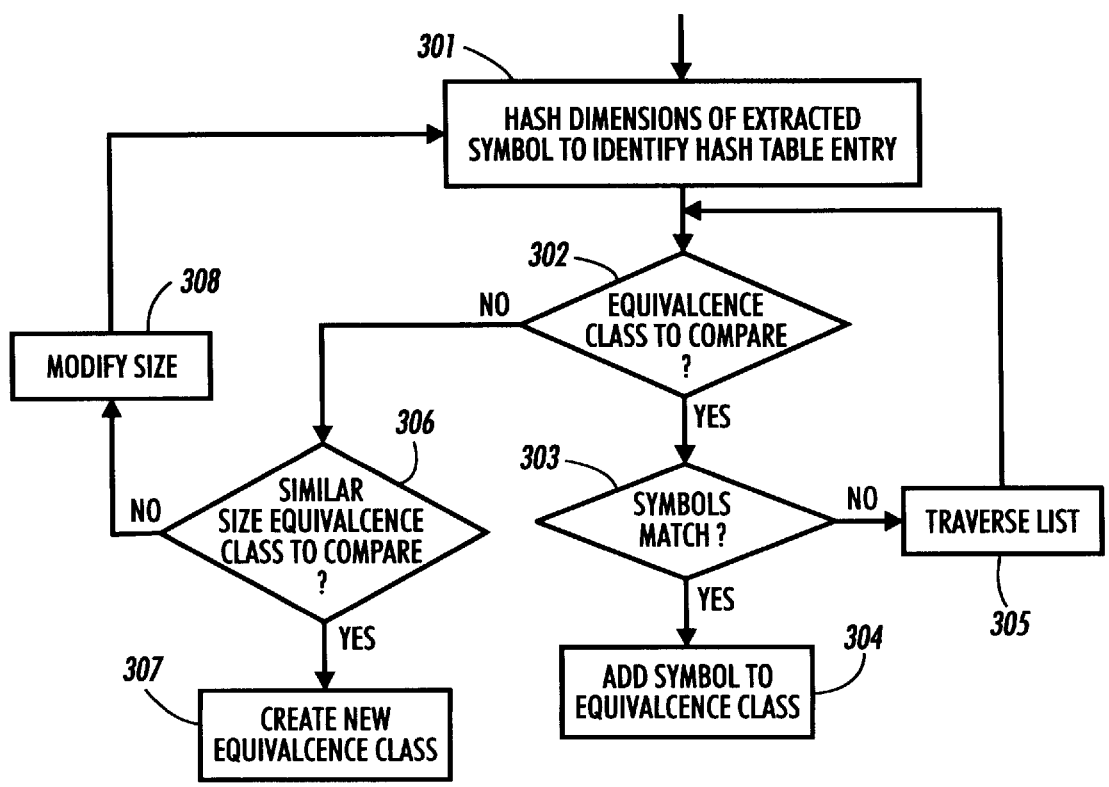
FIG. 3 is a flowchart illustrating the steps performed for using the symbol dictionary of FIG. 2 in the course of symbol comparison and equivalence class classification as may be performed in the currently preferred embodiment of the present invention.

The process of symbol classification as performed in the currently preferred embodiment is described with reference to FIGS. 2 and 3. FIG. 2 is a block representation of a data structure referred to herein as a symbol dictionary used for the matching process of the currently preferred embodiment. Referring to FIG. 2, a table 201 has contents which are indexed by the dimensions of the bounding box of a symbol. Each table entry, e.g. table entry 204, may refer to (i.e. point to) one or more equivalence classes 202 that are linked together via a linked data structure. Each equivalence class 202 is comprised of another linked list of instances of the symbol 203 in the class. Each instance of the symbol is represented by a data structure containing position information on the medium where the instance can be found, a bitmap of the instance and information identifying a "best match position". As will be described in greater detail below, the best match position indicates a possible shifted position where the instance best matches the exemplar for the class.

In the currently preferred embodiment, the table 201 is a hash table. A hash table is a well known structure wherein a "many to few" mapping occurs using a random function that returns results modulo the size of the hash table. This property is used in order to maintain and access linked lists of symbols that are of the same dimensions. A linked list is a well known structure wherein an instance of a node in the list points to the next node in the list. It should be noted that the data structure illustrated in FIG. 2 is not intended to limit the scope of the present invention. Use of alternative data structures to support the organization of equivalence classes and comparisons thereto would not cause departures from the spirit and scope of the present invention.

The symbol dictionary illustrated in FIG. 2 is a dynamic structure that is used to enable reference to potential symbol matches. The flowchart of FIG. 3 describes the matching process with respect to using the symbol dictionary. First, a hashing function is performed on the dimensions (i.e. width and height) of the extracted symbol to find the hash table entry containing potential matches, step 301. The entry is examined to determine if there is an equivalence class to check, step 302. The entry has equivalence classes to examine if it is not empty and if the linked list has not already been completely traversed in prior matching attempts. When an equivalence class is identified, it is then determined if the extracted symbol and the exemplar for the equivalence class match, step 303. The exemplar for an equivalence class is either of 1) the symbol that caused the equivalence class to be created, or 2) an averaged symbol created in the course of "committing" an equivalence class (described below). The details of comparing symbols is described in detail below. In any event, if a match occurs with one of the exemplars in the linked list, then the symbol is added to the corresponding equivalence class, step 304. Adding the symbol to the equivalence class involves adding it to the data structure for the equivalence class. If no match occurs the linked list is further traversed, step 305 and a determination is made if there is another equivalence class to compare per step 302.

If there are no longer any equivalence classes in the linked list for the current symbol table entry, a check is made to determine if all similar sized equivalence classes have been checked, step 306. If not, the size parameters used to determine a hash table entry is modified to one of similar size and a new table entry is accessed per step 301. If all similar size equivalence classes have been checked, a new equivalence class is created per step 307. The new equivalence class is placed in the symbol dictionary within the linked list structure of the table entry corresponding to the original size of the extracted symbol.

Two other steps are performed during the course of symbol classification and can be viewed as symbol dictionary management. One is committing and the other equivalence class merging. Committing is a process that is invoked when a predetermined number (e.g. 10) of extracted symbols become part of an equivalence class. The commit process is one where an averaged equivalence class exemplar is finalized, i.e. the bitmap representing the class is committed to. Prior to this step, the equivalence class exemplar was merely the first symbol that caused the creation of the class. The averaged class exemplar is a more accurate representation of all the symbols in the class. This is accomplished by "averaging" the bitmaps representing symbols that are members of the class. The averaging is accomplished by maintaining a histogram which contains a count of the number of the members of the class (at their "best match" alignment) that have "on" pixels at each of the different pixel locations. The exemplar is generated by thresholding this histogram, i.e. in the final exemplar the pixel will be "on" if the corresponding pixel location exceeds a predetermined threshold. The threshold is chosen so that the number of "on" pixels in the exemplar is as close as possible to the median number of "on" pixels in the members of the class.

Once the final exemplar is generated all the symbols are checked to see that they match the averaged class exemplar. This checking uses the same matching criteria described above. Those symbols that do not match the averaged class exemplar are removed from the equivalence class and are treated as newly extracted symbols (i.e. they are matched against existing equivalence classes, etc.)

Besides providing a more accurate class exemplar, averaging facilitates the overall comparison process by freeing up memory resources occupied by the bitmaps of the class members.

Merging is a process where equivalence class exemplars are compared in order to determine if they can be merged (i.e. combined). Merging is desirable because it reduces the total number of equivalence classes. Reducing the number of equivalence classes results in improved performance. In the currently preferred embodiment, merging happens as a second pass after the all the symbols have been processed and equivalence classes created. However, it could also be performed at various checkpoints in the process (e.g. after each page of a multi-page document being processed). The merging process is merely one where the matching processes described above are applied to the set of class exemplars, and two classes are combined if their exemplars match.

The equivalence class committing and merging processes have particular relevance to the image compression/decompression embodiment described below.

Symbol Matching

As noted above, the matching of symbols is the heart of the classification process. The matching technique of the currently preferred embodiment is an improved Hausdorff-like method. The comparison of two symbols is bi-directional. Suppose that two bitmaps, A and B, are to be compared to determine whether they represent two instances of the same shape. Each bitmap contains a number of points that are turned on ("black" points) against a background of points that are "off" ("white" points).

For the purposes of matching, two new bitmaps are computed $A^\delta$ and $B^\delta$, which are dilated versions of the original bitmaps. In the currently preferred embodiment, the dilation is topology preserving, i.e. the local connectedness is the same as the originals, but the boundaries of the symbol are thickened slightly. The preferred technique for such a dilation is described in greater detail below. The dilated versions represent a tolerance for acceptable "noise" resulting from the quantization and other effects that may perturb the boundaries of the symbols. The test is then to see if most of the black points in A lie inside the shape of $B^\delta$, and if most of the black points in B lie inside the shape $A^\delta$. If both of these tests are passed, then it is concluded that A and B represent the same shape (i.e. they match).

The rationale behind this test lies in a model of the printing and scanning process; if A and B represent the same symbol (or have the same shape), then their boundaries should (for the most part) match. However, since the scanning process is one of sampling points at a predetermined density, each symbol's boundary could have shifted by a pixel or two because of the pixel grid performing the sampling. Thus, if the boundary of A lies close to the boundary of B, then A will lie within $B^\delta$ (since it is a bit thicker) and vice versa. It should be noted that both directions of the test are necessary since using only one direction may yield erroneous matches when one symbol resembles a subset of the other symbol, e.g. the letter "O" and the letter "Q".

Figure 4:
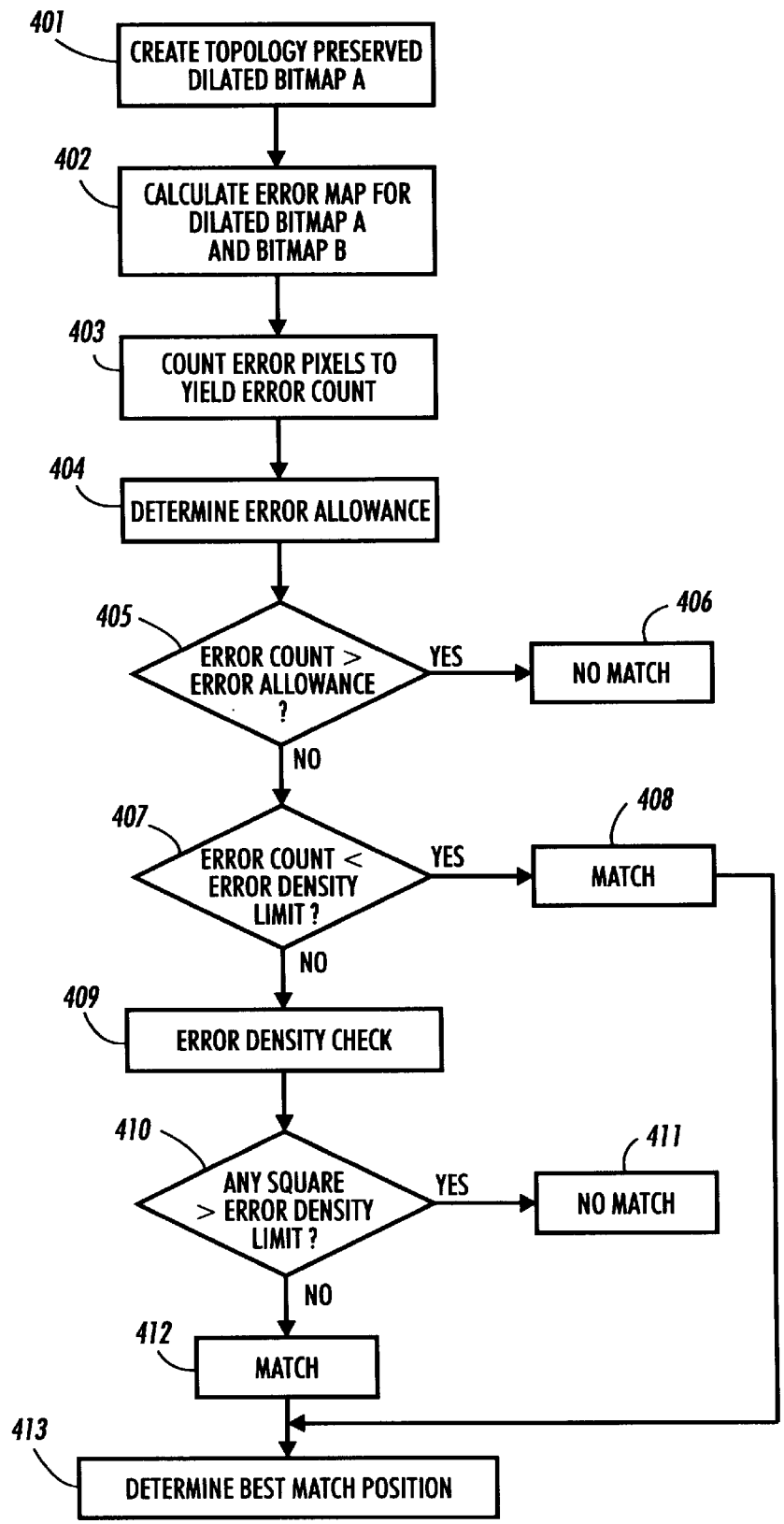
FIG. 4 is a flowchart of the steps for matching symbols contained in a bitmap as may be performed in the currently preferred embodiment of the present invention.

The manner in which the comparison is made is described with reference to the following example. In this example, bitmap A is compared to bitmap B, i.e. does B fit inside of A to within some tolerances? If this can be answered in the affirmative, the identical steps are performed for the "other" side, i.e. does A fit inside B?. The steps for determining a match are described in the flowchart of FIG. 4. For the sake of brevity, only one side of the comparison is described. Referring to FIG. 4, a topology preserving dilation is performed on bitmap A to create a dilated representation of the symbol in bitmap A (referred to as dilated bitmap A), step 401. The steps for performing such a dilation are described in greater detail below. An error bitmap is then calculated for dilated bitmap A and bitmap B, step 402. The error bitmap indicates "on" pixels in bitmap B that are not present in dilated bitmap A. In the currently preferred embodiment, the error bitmap is with respect to a dilated bitmap A and is calculated by first inverting the values of dilated bitmap A (i.e. converting 1s to 0s and vice versa) and then performing a logical AND function with bitmap B. The result is that the error pixels having a 1 value indicate where bitmap B does not fit inside dilated bitmap A. Also, it should be noted that each bitmap is represented so that its origin lies at the upper left hand corner. It is based on this alignment that the logical AND is performed on corresponding pixels. It is also worth noting that the error bitmap generated herein is different from an error bitmap of the prior art (typically an XOR of the two bitmaps). A simple XOR would not work in the present invention because XOR would have created an error pixel of value 1 not only where bitmap B doesn't fit in dilated bitmap A, but also where dilated bitmap A is not overlapping with bitmap B. The number of error pixels in the error bitmap having a value of 1 are then counted yielding an error count, step 403.

An error allowance is then determined based on the size of the symbol contained in bitmap B, step 404. This error allowance defines a threshold for errors that takes into account the effects of noise and other quantization effects. In the currently preferred embodiment, the error allowance is determined based on a non-linear function having the properties that there is no allowance for small symbols and a proportionately larger allowance for large symbols. Calculation of the error allowance is described in greater detail below. It is then determined if the error count is greater than the calculated error allowance, step 405. If the error count is greater than the error allowance, then bitmap B does not fit inside dilated bitmap A to within the allowed tolerance, and there is no match, step 406. Otherwise, the error count is compared to an error density limit, step 407. The error density limit is a threshold amount for identifying close groupings of "on" error pixels. In the currently preferred embodiment the error density limit is 3. If a check involving the error pixels and the error density limit (described below) passes, then there is a match, i.e. bitmap B does fit inside dilated bitmap A, step 408. Processing would then proceed to step 413 to determine a best match position (described in more detail below.)

If the error count is greater than the error density limit, then the error density check is performed. Here, the error bit map calculated in step 402 is examined in 3×3 square increments in order to detect excessive groupings of "on" error pixels, step 409. A determination is made if any 3×3 square exceeds the error density limit, step 410. If any 3×3 square exceeds the error density limit, there is no match, step 411. If it is determined that no 3×3 square exceeds the error density limit, then there is a match, step 412.

When both directions are tested and a match is determined, it has been determined that for symbol classification embodiments that a "best match" position be identified, step 413. The "best match" position is defined as the position relative to the equivalence class exemplar, that yields the fewest errors when two bitmaps are compared. As noted above, each bitmap is oriented on a coordinate system having the tipper left hand corner as the origin. The comparison described with reference to FIG. 4 is performed assuming that the origins of each bitmap are perfectly aligned. However, this alignment may not yield the best match. In the currently preferred embodiment, the bitmap corresponding to the extracted symbol is shifted relative to the origin and the matched bitmap in order to find the location where the most "on" pixels are aligned. This is performed by shifting, performing a logical AND function between the two bitmaps and counting the number of "on" pixels in the result. The shifted position with the most "on" pixels is the "best match" location. This location is saved with the bitmap. It is desirable to identify this best match location because it facilitates the generation of the most accurate "final" representation of an equivalence class when an equivalence class is committed.

Nonlinear Error Allowances

Because of quantization effects introduced in the scanning process, when comparing symbols a certain amount of error is determined to be acceptable. In the currently preferred embodiment, the error allowance is nonlinear with respect to the size of the characters. If A and B are bitmaps containing small symbols (e.g. 6 point characters scanned at 300 dots per inch), then it is reasonable to insist that they must pass the bi-directional test strictly—that is, no pixels of A may lie outside the dilated B and no pixels of B may lie outside the dilated A. Conversely, if A and B are bitmaps that contain large symbols (e.g. 12 point characters at 300 dots per inch), then a strict bi-directional test may be too strict because the differences between the symbol boundaries may be proportionally larger. So for large symbols a nonzero error allowance is used in the bi-directional test, insisting that all but $k_1$ of the points of A lie inside the dilated B and all but $k_2$ of the points of B lie inside the dilated A.

As noted above, the error allowance used is a function of the "size" of A and B and is calculated separately for each side of the bi-directional test. The "size" of a symbol here is measured not simply by the dimensions of the symbols bounding box, but by the length of the symbol's boundary (it is the number "on" pixels of the bitmap of the symbol that are adjacent to "off" pixels). The error allowance remains zero while the size of A (or B) is below a certain threshold symbol size (100 pixels), then increases at a rate associated with a "target" error allowance to a second threshold size (200 pixels), then increases at a 2× rate until a third threshold size (300 pixels) wherein the error allowance is again based on the "target" rate.

The error allowance is defined as the ratio of error pixels to boundary pixels. It has been experimentally determined that an error allowance of 3 percent of the number of edge pixels when used in this model provides for acceptable results in most documents. However, as discussed above, simply using what amounts to a linear error allowance is deficient. The following rules describe the non-linear nature of the error allowance of the currently preferred embodiment:

(1) let e(A) be the number of edge (boundary) black pixels in A
(2) let f be the "target" error allowance, namely 3 percent of the number of edge pixels (the slope of the straight line), If $f*e(A)<=3$, then the error allowance is 0.
If $3<f*e(A)<=6$, then the error allowance is $f*e(A)-3$.
If $6<f*e(A)$ then the error allowance is $MIN(3+2*(f*e(A)-6), f*e(A))$.

Figures 5, 6:
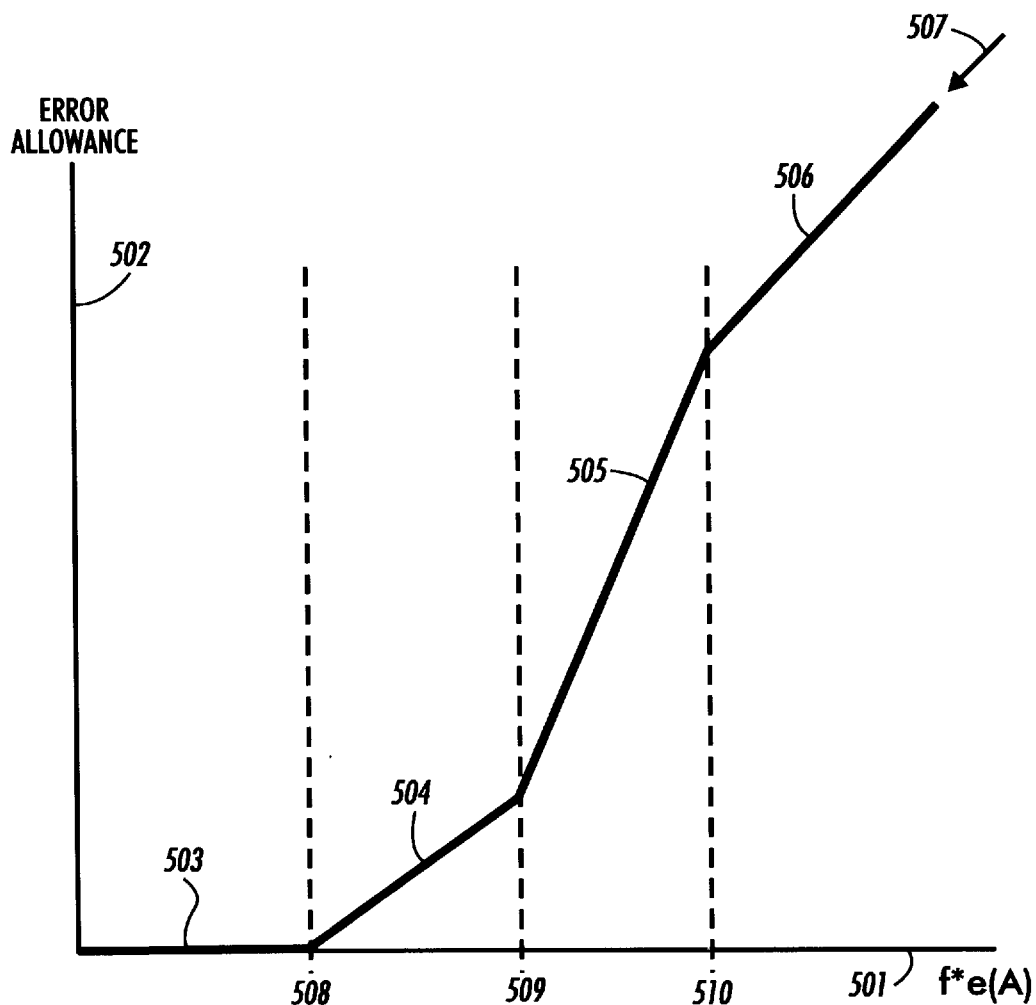
FIG. 5 is a diagram illustrating the relationship between an error allowance value and the size of a symbol.
FIG. 6 is a diagram illustrating the idea of neighboring pixels in the currently preferred embodiment of the present invention.

FIG. 5 is a graphical representation of these rules as applied. Referring to FIG. 5, a horizontal axis 501 represents the value $f*e(A)$, and a vertical axis 502 represents the error allowance. Line 507 plots the relationship between symbol size and error allowance. Applying the rules above, the line 507 has the following slope values:

(1) from $f*e(A)$ values 0 to 3, it has slope 0 illustrated as segment 503
(2) from $f*e(A)$ values 3 to 6, it has slope 1 (i.e. the target error allowance of 0.03) illustrated as segment 504
(3) from $f*e(A)$ values 6 to 9, it has slope 2 (i.e. twice the target error allowance) illustrated as segment 505
(4) from $f*e(A)$ values 9 up, it has slope 1 illustrated as segment 506

Here, the value 3 represents a first threshold 508, the value 6 represents a second threshold 509 and the value 9 represents a third threshold 510.

While other functions could be used to estimate an error allowance, such functions must have the characteristics that for small shapes, no errors should be allowed while for larger shapes, more error can be tolerated.

Topology Preserving Dilation

As noted above, the new bitmaps generated for the matching process, namely $A^\delta$ and $B^\delta$, are dilated representations of the original bitmaps. In the currently preferred embodiment, a topology-preserving dilation is performed. In the topology preserving dilation, even obscure, but perceptually important, aspects of the shape are preserved. This is exemplified by comparing the characters "h" and "b". Their general shape is quite similar, apart from the gap at the bottom of the "h". Simply thickening the lines could cause the gap at the bottom of the "h" to close resulting in the "b" fitting inside the dilated "h" (the "h" would clearly fit into the dilated "b"). This would cause the shapes to be incorrectly matched.

In topology preserving dilation, the local topology of the "on" pixels is examined and an "off" pixel is turned "on" during the dilation only if turning it "on" does not close up a small gap or hole that is present in the original bitmap. Thus, the dilated "h" still has a gap at the bottom, and the "b" does not fit inside the boundary of this dilated shape. If the shapes do not contain any such small gap, this dilation is equivalent to a normal dilation.

The topology preserving dilation technique consists of a set of local rules that determine the dilated value of a given "off" pixel. Each "off" pixel is considered with respect to the original undilated bitmap. So in practice, a dilated representation being created is accomplished by copying all "on" pixels directly and determining if any of the "off" pixels should be turned "on" based on the local rules.

Described with reference to FIGS. 6 to 8 are the rules for the case of dilation by one pixel (4 connected neighborhood). Similar rules would be used for dilation by two or more pixels. The dilation amount used in practice will depend on various factors including the printing density of the original image and scanning density. In any event, referring to FIG. 6, the dilation of the currently preferred embodiment operates by determining whether or not to turn on a given "off" pixel (denoted by the symbol "@") based on the values of 12 neighboring pixels (each denoted by the symbol "?"). As can be seen in FIG. 6, the configuration of pixels examined has the basic characteristics that horizontal and vertical neighbors are examined at a depth of two pixels while diagonal neighbors are examined at a depth of one pixel.

The general principle of the topology preserving dilation method of the present invention is to turn "on" the center pixel if one of its immediate four neighbors (i.e. horizontal or vertical neighbors) is on, unless that would change the local connectedness within this 13 pixel neighborhood. It has been determined that the following rules implement this principle. For the sake of brevity, only the case of the left neighbor being on is described. The other cases are obtained by 90 degree rotations of these patterns (corresponding to the three other neighbors: above, right, and below). Recall that the symbol @ denotes an "off" pixel which is being examined as to whether or not it should be turned "on" in the dilation. In the FIGS. 7–8 describing the rules, the symbol O denotes a neighboring "off" pixel and the symbol X denotes a neighboring "on" pixel.

The pattern X@, i.e. the left neighbor is an "on" pixel, yields an "on" except when it is in one of the exception pixel configurations illustrated in FIG. 7. It should be noted that only certain of the neighboring pixels bring rise to the exceptions. In these cases it does not matter what the value of the other pixels is. Each of the exceptions illustrated in FIG. 7 are indicative of a hole or gap that may abut the pixel being evaluated. However, FIG. 8 illustrates the exceptions to the exceptions of FIG. 7. When the pixel neighborhood is in one of the configurations of FIG. 8, the pixel being evaluated is turned "on".

Thus overall there are four rules (for the four directions, left, right, above and below) each with four exceptions and seven exceptions to the exceptions, for a total of 48 tests. In the currently preferred embodiment, these tests are used to build a table, mapping patterns of 13 bits (the neighborhood around the "@" pixel) to the outcome (pixel on or off).

In the currently preferred embodiment, when a bitmap is dilated, it is scanned and all pixel locations examined. When an "off" pixel is encountered, the neighborhood of 13 pixels is used to create a 13 bit index into the outcome table described above. The pixel being examined will then be turned "on" according to the table results.

In practice, this dilation method greatly improves the Hausdorff bitmap comparison method briefly described with respect to the prior art. This is of particular importance for bitmaps of small characters, and other tokens with "fine grain" shape.

Data Compression/Decompression Embodiment

As described above, the present invention is preferably embodied in a system for text image compression and decompression. Scanned images containing machine-printed text can be compressed by grouping the symbols found into equivalence classes. In this system, the symbol classifier is used to classify extracted symbols into equivalence classes which are represented by unique exemplars. The number of created equivalence classes will be significantly less than the total number of symbols extracted. Once all the extracted symbols have been classified into equivalence classes, a compressed output stream is created. The created Output stream is comprised of a dictionary comprised of the exemplars followed by exemplar ID/position pairs.

When the image is decompressed, each of the pairs is processed so that an instance of the identified exemplar is placed at the specified location. This continues for all the pairs until the original text image is recreated.

In the description above, it is assumed that the scanned image was created using a scanner having a resolution of 300 dots per inch (dpi).Various threshold values described herein are based upon this resolution. It would thus be apparent to one of skill in the art that different threshold values may be used if the scanned image was created using a scanner with a resolution different than 300 dpi. Further variations in dilation values may be necessary if for example, the medium creating the text was created using a printer having a resolution of 300 dpi and the medium creating the scanned image was created using a scanner having a resolution of 600 dpi. In this case, it may be necessary to create dilated representations of up to 2 pixels, as opposed to the 1 pixel described herein.

Figure 9:
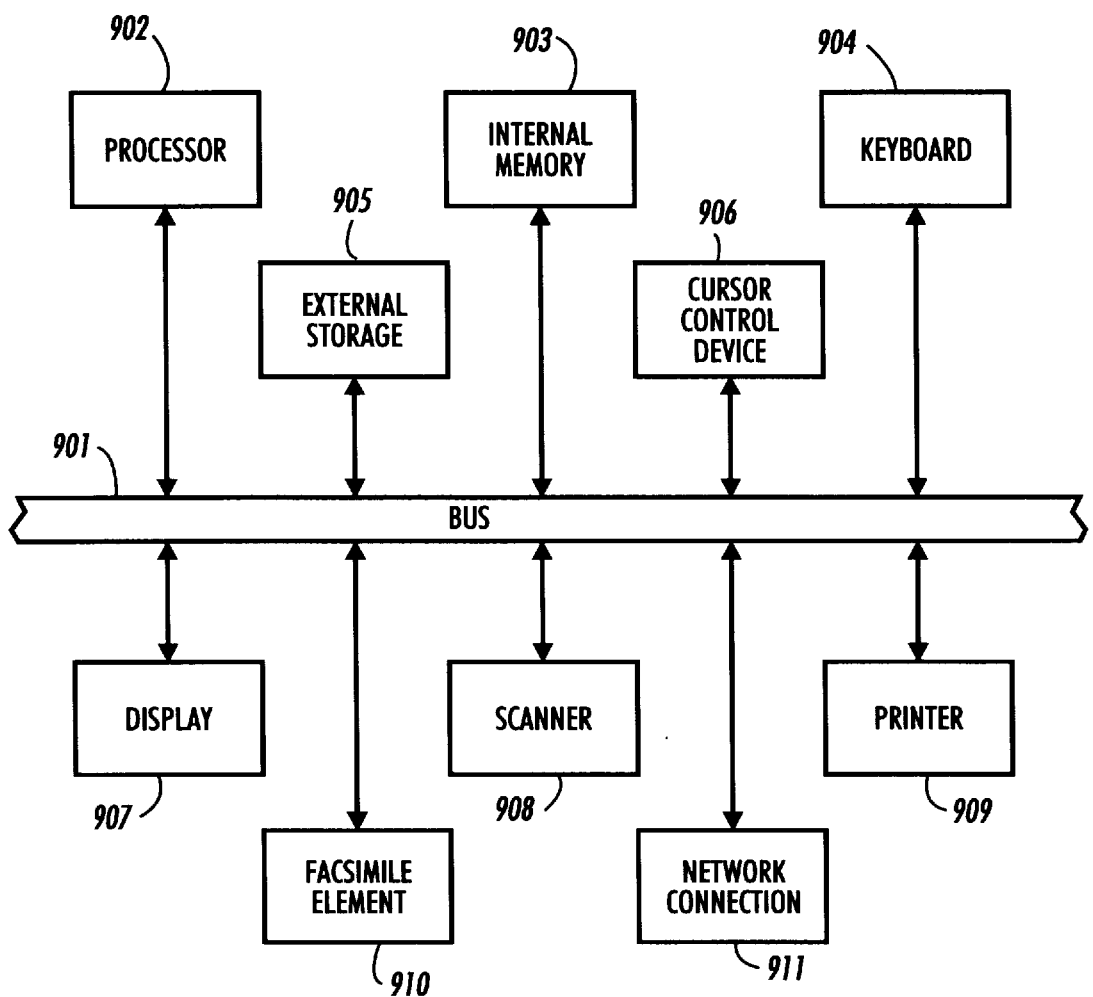
FIG. 9 is a block diagram of a computer based system in which the currently preferred embodiment of the present invention may be utilized.

Overview of a Computer Based System in the Currently Preferred Embodiment of the Present Invention The computer based system on which the currently preferred embodiment of the present invention may be used is described with reference to FIG. 9. Referring to FIG. 9, the computer based system is comprised of a plurality of components coupled via a bus 901. The bus 901 illustrated here is simplified in order not to obscure the present invention. The bus 901 may consist of a plurality of parallel buses (e.g. address, data and status buses) as well as a hierarchy of buses (e.g. a processor bus, a local bus and an I/O bus). In any event, the computer system is further comprised of a processor 902 for executing instructions provided via bus 901 from Internal memory 903 (note that the Internal memory 903 is typically a combination of Random Access or Read Only Memories). Such instructions are those that are preferably implemented in software for carrying out the processing steps outlined above in the flowcharts of FIGS. 1, 3–4 and for implementing the rules for topology preserving dilation described with reference to FIGS. 6–8. The processor 902 and Internal memory 903 may be discrete components or a single integrated device such as an Application Specification Integrated Circuit (ASIC) chip. Further the combination of processor 902 and Internal Memory 903 comprise circuitry for performing the functionality of the present invention.

Also coupled to the bus 901 are a keyboard 904 for entering alphanumeric input, external storage 905 for storing data such as a compressed text image data file, a cursor control device 906 for manipulating a cursor, and a display 907 for displaying visual output. The keyboard 904 would typically be a standard QWERTY keyboard but may also be telephone like keypad. The external storage 905 may be fixed or removable magnetic or optical disk drive. The cursor control device 906 will typically have a button or switch associated with it to which the performance of certain functions can be programmed. Further coupled to the bus 901 is a scanner 908. The scanner 908 provides a means for creating a bitmapped representation of a medium (i.e. a scanned document image).

Optional elements that could be coupled to the bus 901 would include printer 909, facsimile element 910 and network connection 911. The printer 909 could be used to print the bitmapped representation. The facsimile element 910 may contain an element used to transmit a image data that has been compressed using the present invention. Alternatively, the facsimile element 910 could include an element for decompression of a document image compressed using the present invention. The network connection 911 would be used to receive and/or transmit data containing image data. Thus, the image data utilized by the present invention may be obtained through a scanning process, via a received fax or over a network.

Thus, a method and apparatus for comparing symbols extracted from binary images of text for classifying into equivalence classes is disclosed. While the present invention is described with respect to a preferred embodiment, it would be apparent to one skilled in the art to practice the present invention with other alternative embodiments. Such alternate embodiments would not cause departure from the spirit and scope of the present invention.

We claim:

1. A method for comparing a first bitmap of a symbol image to a second bitmap of a symbol image to determine a match comprising the steps of:
   a) generating a topology preserved dilated representation for said first bitmap of a symbol image, where the symbol image is dilated without effecting local topology or connectedness;
   b) matching said topology preserved dilated representation of said first bitmap of a symbol image to said second bitmap of a symbol image to determine if a match exists;
   c) if a match exists, generating a topology preserved dilated representation of said second bitmap of a symbol image;
   d) matching said topology preserved dilated representation of said second bitmap of a symbol to said first bitmap of a symbol image to determine if a match exists;
   e) if a match exists, indicating that said first bitmap of a symbol image matches said second bitmap of a symbol image.

2. The method as recited in claim 1 wherein said step of matching said topology preserved dilated representation of said first bitmap of a symbol image to said second bitmap of a symbol image to determine if a match exists is further comprised of the steps of:
   b1) generating an error bitmap between said dilated represented of said first bitmap of a symbol image and said second bitmap of a symbol image;
   b2) determining an error allowance based on the size of said first bitmap of a symbol image and a predetermined error allowance factor;
   b3) counting the number of errors indicated in said error bitmap to yield an error count;
   b4) determining that no match exists if said error count is greater than said error allowance;
   b5) if said error count is less than or equal to said error allowance, examining said error map to determine if any predetermined subset size in said error map has a number of errors that exceeds a predetermined error density limit;
   b6) determining that no match exists if said predetermined error density limit is exceeded by any subset; and
   b7) determining that a match exists if said predetermined error density limit is not exceeded by any subset.

3. The method as recited in claim 2 wherein said step of generating a topology preserved dilated representation of said first bitmapped representation of a symbol image is further comprised of the step of converting off pixels to on pixels in said topology preserved dilated representation of said first symbol image if said conversions do not destroy the local connectedness of pixels of said symbol image.

4. The method as recited in claim 3 wherein said step of converting off pixels to on pixels in said topology preserved dilated representation of said first symbol image if they do not destroy the connectedness of pixels of said symbol image is further comprised of the steps of:
   generating a table for determining connectedness based on a predetermined set of local rules as applied to a predetermined number of neighboring pixels, each table entry containing an indicator as to whether an off pixel should be turned on, said table indexed by the values contained in said predetermined number of neighboring pixels; and
   finding an off pixel;
   determining a table index value based on the values of said predetermined number of neighboring pixels;
   accessing said table using said table index value to determine if said pixel should be turned on.

5. A method for matching symbols from a bitmapped representation of text comprising the steps of:
   a) extracting a symbol image from said bitmapped representation of text;
   b) comparing said symbol image to an exemplar of an equivalence class of a potential match image by performing the substeps of:
      b1) generating a topology preserved dilated representation for said symbol image, where the symbol image is dilated without effecting local topology or connectedness;
      b2) matching said topology preserved dilated representation of said symbol image to said exemplar to determine if a match exists;
      b3) if a match exists, generating a topology preserved dilated representation of said exemplar, where the representation of said exemplar is dilated without effecting local topology or connectedness;
      b4) matching said topology preserved dilated representation of said exemplar to said symbol image to determine if a match exists;
      b5) if a match exists, indicating that said symbol image matches said exemplar;
   c) if step b) yields a match, adding said symbol image to the equivalence class of said potential match image;
   d) if step b) does not yield a match, repeating step b) for all potential match images until all potential match images compared or a match is found; and
   e) if said symbol image does not match any potential match image, creating and storing a new equivalence class for said symbol image in a dictionary.

6. The method as recited in claim 5 wherein said substep of matching said topology preserved dilated representation of said symbol image to said exemplar to determine if a match exists is further comprised of the steps of:
   generating an error bitmap between said dilated represented of said symbol image and said exemplar;
   determining an error allowance based on the size of said symbol image and a predetermined error allowance factor;
   counting the number of errors indicated in said error bitmap to yield an error count;
   determining that no match exists if said error count is greater than said error allowance;
   if said error count is less than or equal to said error allowance, examining said error map to determine if any predetermined subset size in said error map has a number of errors that exceeds a predetermined error density limit;
   determining that no match exists if said predetermined error density limit is exceeded by any subset; and
   determining that a match exists if said predetermined error density limit is not exceeded by any subset.

7. The method as recited in claim 6 wherein said step of determining an error allowance based on the size of said symbol image and an error allowance factor is further comprised of the steps
   determining the number of boundary pixels N for said symbol image, said number of boundary pixels representing the size of said symbol image;

determining an error allowance factor F;

if F*N is less than a first threshold value T1, assigning a zero error allowance;

if F*N is greater than said first threshold value but less than or equal to a second threshold value T2, assigning an error allowance equal to (F*N)−T1;

if F*N is greater than said T2 but less than or equal to a third threshold value T3, assigning an error allowance equal to T1+2*((F*N)−T2);

if N is greater than T3, assigning an error allowance equal to the product F*N.

8. The method as recited in claim 7 wherein said first threshold value is 100.

9. The method as recited in claim 8 wherein said second threshold value is 200.

10. The method as recited in claim 9 wherein said third threshold value is 300.

11. The method as recited in claim 7 wherein said step of generating a topology preserved dilated representation of said symbol image is further comprised of the step of converting off pixels to on pixels in said topology preserved dilated representation if said conversions do not destroy the local connectedness of pixels of said symbol image.

12. The method as recited in claim 11 wherein said step of converting off pixels to on pixels in said topology preserved dilated representation if they do not destroy the connectedness of pixels of said symbol image is further comprised of the steps of:

generating a table for determining connectedness based on a predetermined set of local rules as applied to a predetermined number of neighboring pixels, each table entry containing an indicator as to whether an off pixel should be turned on, said table indexed by the values contained in said predetermined number of neighboring pixels; and finding an off pixel;

determining a table index value based on the values of said predetermined number of neighboring pixels;

accessing said table using said table index value to determine if said pixel should be turned on.

13. The method as recited in claim 12 wherein said neighboring pixels are at most two pixels away in the top, bottom, left and right directions and at most one pixel away in the diagonal directions.

14. The method as recited in claim 5 wherein said step adding said symbol image to the equivalence class of said potential match image performing the substeps of shifting said symbol image and comparing to said exemplar to identify a best match location; and storing said best match location with said symbol image.

15. The method as recited in claim 5 wherein prior to said step of comparing said symbol image to an exemplar of said potential match image performing the step of identifying a potential match image from a dictionary of previously extracted symbols based on a predetermined size criteria.

16. A method for compressing a bitmapped representation of a textual image comprising the steps of;

a) extracting symbol images from said bitmapped representation of text;

b) for each extracted symbol image, classifying said symbol images into a plurality of equivalence classes by performing the substeps of:

b1) determining if said symbol image matches a topology preserved dilated representation of an exemplar for an equivalence class, where the representation of said exemplar is dilated without effecting local topology or connectedness; and b2) determining if said exemplar matches a topology preserved dilated representation of said symbol image, where the symbol image is dilated without effecting local topology or connectedness;

b3) if the matches of steps b1 and b2 are successful, adding said symbol image to the equivalence class represented by said exemplar;

b4) if either of the matches of steps b1 or b2 are not successful, trying another exemplar for an equivalence class of a predetermined similar size;

b5) if no equivalence class of said predetermined similar size exists or all have been tested with no match, creating a new equivalence class for said symbol image; and c) outputting a compressed image representation of said textual image comprised of said equivalence exemplars and placement information for positioning said exemplars on a medium.

17. The method as recited in claim 16 further comprising the step of:

d) concurrent with step b) checking if an equivalence class has a predetermined number of members, and if it does committing said equivalence class so that the equivalence class exemplar becomes the average of the equivalence class member symbols.

18. The method as recited in claim 17 further comprising the step of:

e) comparing equivalence classes to determine if they can be merged by using the steps b1)–b2) and merging equivalence classes when it is determined that the respective exemplars of the classes match.

19. A system for compressing text image data comprising:

input circuitry for receiving a bitmapped representation of a textual image;

extracting circuitry coupled to said input circuitry, said extracting circuitry for extracting symbol images from said bitmapped representation of a textual image;

storage means for storing equivalence classes;

classifying circuitry coupled to said extracting circuitry, said classifying circuitry for classifying extracted symbol images into equivalence classes, each equivalence class represented by an exemplar, said classifying circuitry further comprising;

dilating circuitry for creating a topology preserved dilated bitmap, said dilated bitmap representing a dilation of a symbol image where the symbol image is dilated without effecting the local topology or connectedness;

error allowance generation circuitry for generating an error allowance based on symbol image size;

comparing circuitry coupled to said dilating circuitry and said error allowance generation circuitry, said comparing circuitry for comparing an undilated bitmap with a dilated bitmap to determine if a match exists using said error allowance; and committing circuitry for generating an exemplar for an equivalence class based on bitmaps of symbols contained in the equivalence class;

dictionary creation circuitry coupled to said storage means and said classifying circuitry, said dictionary creation circuitry for creating a dictionary for maintaining said equivalence classes, said dictionary creation circuitry further comprised of merging circuitry for merging equivalence classes when it is determined that the exemplars of the equivalence classes match; and output generation circuitry for outputting exemplar identifier and position information for all the symbols in said textual image and a dictionary of exemplars.

20. A program storage device readable by a machine, tangibly embodying a program of instructions executable by the machine to perform method steps for matching symbols contained in a bitmapped representation of text, said method steps comprising:

a) extracting a symbol image from said bitmapped representation of text;

b) comparing said symbol image to an exemplar of an equivalence class of a potential match image by performing the substeps of:

b1) generating a topology preserved dilated representation for said symbol image, where the symbol image is dilated without effecting the local topology or connectedness;

b2) matching said topology preserved dilated representation of said symbol image to said exemplar to determine if a match exists;

b3) if a match exists, generating a topology preserved dilated representation of said exemplar, where the representation of said exemplar is dilated without effecting the local topology or connectedness;

b4) matching said topology preserved dilated representation of said exemplar to said symbol image to determine if a match exists;

b5) if a match exists, indicating that said symbol image matches said exemplar;

c) if step b) yields a match, adding said symbol image to the equivalence class of said potential match image;

d) if step b) does not yield a match, repeating step b) for all potential match images until all potential match images compared or a match is found; and e) if said symbol image does not match any potential match image, creating and storing a new equivalence class for said symbol image in a dictionary.

21. The program storage device as recited in claim 20 wherein said method steps are further for performing data compression and said method steps further comprised of the step of:

f) when all symbols have been processed, outputting a compressed image representation of said bitmapped representation of text comprised of said equivalence exemplars and placement information for positioning said exemplars on a medium.

22. The program storage device as recited in claim 21 wherein said method steps are further comprised of the step of:

g) concurrent with step b) checking if an equivalence class has a predetermined number of members, and if it does committing said equivalence class so that the equivalence class exemplar becomes the average of the equivalence class member symbols.

23. The program storage device as recited in claim 22 wherein said method steps are further comprised of the step of:

h) comparing equivalence classes to determine if they can be merged by using the steps b1)–b2) and merging equivalence classes when it is determined that the respective exemplars of the classes match.

* * * * *